United States Patent

[11] 3,532,125

[72] Inventors Wilhelm Sydow Everett
Santa Paula, California 93060;
John Francis Richards, Santa Paula,
California 93060
[21] Appl. No. 777,269
[22] Filed Nov. 20, 1968
[45] Patented Oct. 6, 1970
[73] Assignee Pulsation Controls Corporation
San Paula, California
a corporation of California

[54] PUMP SUCTION PULSATION DAMPENER
3 Claims, 3 Drawing Figs.
[52] U.S. Cl. ................................................... 138/30,
415/119
[51] Int. Cl. .....................................................F04b 11/00,
F16l 55/04
[50] Field of Search........................................... 103/223,
224, 150; 138/26, 30; 123/139.14; 137/568;
239/323

[56] References Cited
UNITED STATES PATENTS
57,412 8/1866 Van Der Weyde ............ 103/224
3,204,631 9/1965 Fields............................ 103/150X FOREIGN PATENTS
786,402 11/1957 Great Britain............. 138/26

*Primary Examiner*—Robert M. Walker
*Attorney*—Pastoriza and Kelly

ABSTRACT: A pulsation dampener includes a hollow cylindrical member and an elongated pipe section passing coaxially through the member. The entrance and exit ends of the pipe connect between an input line and suction port side of a pump. The enclosed space between the exterior of the pipe section passing through the cylindrical member and the interior wall of the member defines an annular chamber. A plurality of openings in the pipe section provide communication between this chamber and liquid passing through the pipe section. The annular chamber itself is filled with a plurality of small plastic spheres sealingly enclosing a gas. The combination of the liquid and spheres filling the annular chamber completely provides a medium of bulk modulus of elasticity between that of a gas alone or a liquid alone so that proper pulsation dampening for certain applications is readily realized.

Patented Oct. 6, 1970

3,532,125

INVENTORS
WILHELM S. EVERETT
BY JOHN F. RICHARDS

Elliott & Pastoriza
ATTORNEYS 3,532,125

PUMP SUCTION PULSATION DAMPENER

This invention relates generally to pulsation dampeners and more particularly to a liquid pulsation dampener for use on the suction side of pumps.

BACKGROUND OF THE INVENTION

Liquid pulsation dampeners which comprise, essentially, a liquid passage with a chamber portion of larger dimension than that of the passage itself either in line with liquid flow or laterally disposed with respect to the liquid passage for dampening pressure pulsations in the liquid are well known in the art. A detailed teaching of such liquid type pulsation dampeners is fully set forth in U.S. Pat. No. 2,727,470 issued to Ludwig and assigned through mesne assignment to the same assignee as the present invention.

In addition to liquid type pulsation dampeners wherein a chamber is completely filled with liquid, there are also known in the art pulsation dampeners in which a gaseous medium is used as an elastic volume for controlling pulsations for either gases or liquids. In the case of liquids, a membrane or diaphragm is usually employed to seal off the liquid from the chamber incorporating the gas. Alternate compression and expansion of the gas through the medium of the diaphragm serves to dampen certain pulsations present in the liquid.

When a liquid alone is employed in a chamber such as taught in the above referred to Ludwig patent, the bulk modulus of elasticity may be of the order of 300,000. On the other hand, when a gas alone is used to effect dampening, the bulk modulus of elasticity may lie somewhere between 20 and 200. There are certain applications however wherein liquid pulsations exist such as at the suction or inlet side of a pump operating at relatively low pressures; such as 80 pounds or less wherein a pulsation dampener having a chamber completely filled with liquid or, alternatively, a pulsation dampener utilizing a chamber filled with gas do not function as well as would a pulsation dampener provided with a chamber incorporating a medium having a bulk modulus of elasticity between that of a liquid alone or a gas alone.

BRIEF DESCRIPTION OF THE PRESENT INVENTION

With the foregoing in mind, the present invention contemplates an improved pulsation dampener primarily designed for use with relatively low pressure pumps for connection between the inlet line and suction port of the pump for dampening liquid pulsations in the liquid flow through the pump which pulsation dampener is more effective than either a liquid chamber or gas chamber type dampener of comparable dimensions.

In the preferred embodiment, the pulsation dampener takes the form of a hollow cylindrical member of a first given diameter having an elongated pipe section of a second smaller given diameter passing coaxially through the cylindrical member. The exterior portions of the pipe between its entrance and exit ends defines with the interior wall of the cylindrical member an annular chamber. A plurality of openings in the pipe section provide communication between the liquid passage through the pipe and this annular chamber such that the chamber may become filled with liquid.

The chamber itself, however, is filled with a plurality of small plastic spheres sealingly enclosing gas which may, for example, be at atmospheric pressure. With this arrangement, the annular chamber will become completely filled with liquid except for that space occupied by the small plastic spheres. The bulk modulus of elasticity of the overall combination of liquid and spheres has a value between that which would result if a liquid alone were employed in the annular chamber or if a gas alone were employed with suitable diaphragm separating means to keep the liquid separate from the gas. As a consequence, more efficient dampening of liquid pressure pulsations for certain applications such as at the suction side of relatively low pressure pumping systems is realizable.

BRIEF DESCRIPTION OF THE DRAWINGS

A better understanding of the invention will be had by now referring to a preferred embodiment thereof as illustrated in the accompanying drawings in which.

DETAILED DESCRIPTION OF THE PREFERRED EMBODIMENT

Figure 1:
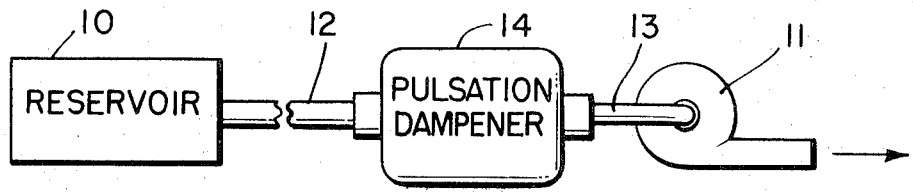
FIG. 1 is a schematic illustration of a pumping system incorporating the pulsation dampener in the suction side of the pump.

Referring first to FIG. 1, there is illustrated, purely schematically, a liquid pump system which may include a reservoir 10, pump 11, with an inlet line 12 normally connecting to the suction line or port 13 for the pump 11. In order to dampen liquid pressure pulsations in the liquid line system, there is provided, in accord with the present invention, the pulsation dampener 14 connected between the inlet line 12 and suction side 13 of the pump.

Figure 2:
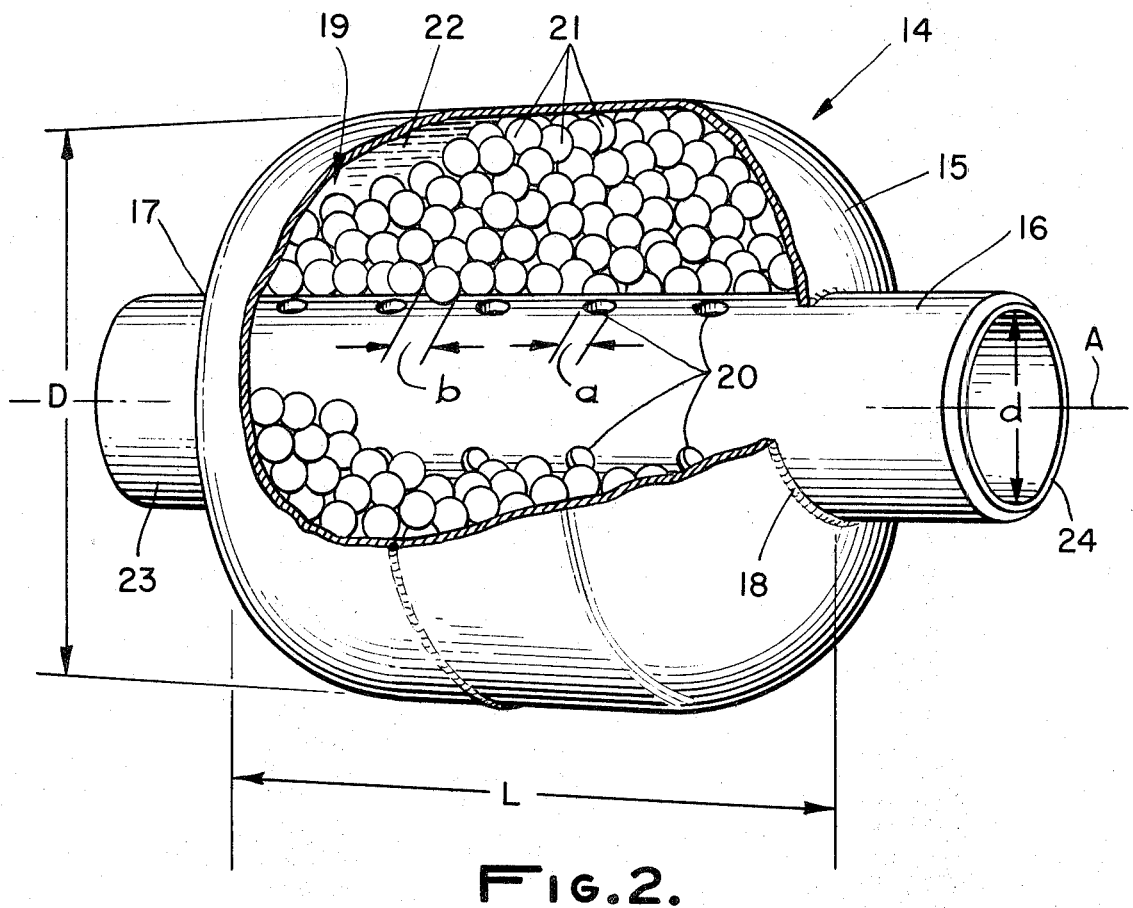
FIG. 2 is a greatly enlarged perspective view partly broken away of the pulsation dampener itself as used in FIG. 1; and, FIG. 3 is a cross section of one of the plastic spheres incorporated in the pulsation dampener of FIG. 2.

Referring now to FIG. 2, details of the pulsation dampener 14 will be described. As shown, there is provided a hollow cylindrical member 15 of a first given diameter D and of a length L. An elongated pipe section 16 of a second given diameter $d$ smaller than the diameter D of the member passes in coaxial relationship as indicated by the axis A through the member 15. The ends of the member 15 as at 17 and 18 are in sealing relationship with the exterior portions of the pipe 16 at its entrance and exit ends.

With the foregoing arrangement, there is defined an annular chamber 19 between the exterior wall of the pipe section 16 within the member and the interior wall of the member itself. As shown, the pipe section 16 includes a plurality of openings 20 along that portion of the pipe within the member 15 to provide communication between the liquid passage defined by the pipe section 16 and the annular chamber 19. Preferably, the total of the cross-sectional areas of the various openings 20 which may extend circumferentially about the entire pipe section 16 totals the cross-sectional area of the pipe section itself.

The pulsation dampener structure is completed by the provision of a plurality of small plastic spheres 21 filling the annular chamber 19. In FIG. 2, it will be noted that the diameter of the openings 20, designated $a$ constitutes a third given diameter which is less than the diameter, designated $b$, of the spheres 21 which constitutes a fourth given diameter. Dimensioning the openings and spheres in this manner will assure that the spheres cannot pass from the annular chamber into the liquid passage through the pipe section 16 by way of the openings 20.

With the foregoing arrangement, liquid 22 will fill the annular chamber 19 when the inlet 23 of the pipe section 16 is connected to an inlet line and the outlet 24 of the pipe 16 is connected to the suction side of a pump. This liquid 22 will completely fill the annular chamber except for the space occupied by the plastic spheres.

Figure 3:
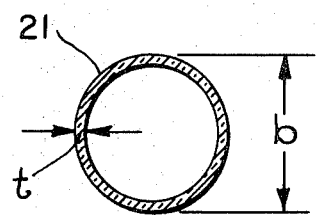

Referring now to FIG. 3, there is shown in enlarged view a cross section of one of the plastic spheres 21. Each of these spheres is identical and therefore a description of one will suffice for all. As shown in FIG. 3, the sphere itself has a wall thickness $t$ which lies between one-twelfth and two-twelfths of the diameter of the sphere $b$. The material constituting the sphere is preferably polypropylene and sealingly encloses gas within the sphere which may be at atmospheric pressure and which, may constitute air.

In an actual embodiment of the pulsation dampener, the ratio of the first diameter D of the member 15 to the diameter $d$ of the pipe section 16 may lie between one-sixth and one-half. Further, the ratio of the diameter D of the member 15 to its length L may lie between one-half and one. Thus, the diameter D in one installation might be 18 inches, the diameter $d$ about 4 inches and the length L about 24 inches. The diameter of the plastic spheres $b$ might be of the order of three-fourths of an inch and the diameter $a$ of the various openings 20 slightly less; for example, one-half inch. With liquid completely filling the annular chamber 19 except for the space occupied by the plastic spheres, the combination of the liquid and spheres provides a medium in the annular chamber which may have a bulk modulus of elasticity of the order of 20,000.

OPERATION

In operation, the pulsation dampener of FIG. 2 is connected between an inlet line and inlet suction port of the pump such as illustrated in FIG. 1. These connections are effected at the inlet 23 and outlet 24 of the pipe section 16.

When liquid is pumped, part of the liquid passing through the pipe section 16 will pass through the openings 20 to fill the annular chamber 19. Eventually, this chamber 19 will be completely filled with liquid except for the space occupied by the small plastic spheres 21. The pump may operate at pressures anywhere between 0 and 80 pounds and even up to 150 or more pounds. Pressure pulsations in the liquid will be communicated to the liquid 22 and thus the plastic spheres 21 filling the annular chamber 19. Peak pressures of the pulsations will tend to actually compress each of the plastic balls through the medium of the liquid. The effective bulk modulus of elasticity of the liquid and balls in the annular chamber is substantially less than that resulting from a liquid alone completely filling the chamber and substantially greater than would be the case were the annular chamber filled only with a gas. With the typical dimensioning described, effective dampening of liquid pulsations which may occur at frequencies of from 5 to 500 per second is realizable.

From the foregoing description, it will thus be evident that the present invention has provided a greatly improved liquid pulsation dampener particularly useful for relatively low pressure pumps for installation at the suction side of the pumps.

We claim:

1. A pulsation dampener for connection to the suction side of a liquid pump for dampening pulsations in liquid being pumped, comprising, in combination:
   a. a hollow cylindrical member of first given diameter;
   b. an elongated pipe section of a second given diameter smaller than said first given diameter passing coaxially through the interior of said member, the ends of said member being in sealing relationship with the exterior portions of said pipe at its entrance and exit ends so that an interior closed annular chamber is defined between the exterior wall of said pipe within said member and the interior wall of said member, said exterior wall of said pipe within said member including a plurality of openings of a third given diameter smaller than said second given diameter providing liquid communication between the interior of said pipe and said annular chamber; and
   c. a plurality of plastic hollow spheres of a fourth given diameter greater than said third given diameter filling said annular chamber whereby when the ends of said pipe section are connected between a liquid input line and input suction port of a pump, said annular chamber becomes completely filled with liquid except for the space occupied by said spheres such that the combined volume of liquid and spheres provides a compressible medium of bulk modulus of elasticity substantially greater than that of a gas and substantially less than that of a liquid alone to thereby provide pulsation dampening of pressure pulses in said inlet liquid to said pump.

2. A pulsation dampener according to claim 1, in which said pressure pulses in said liquid vary between 0 and 150 pounds per square inch, said plastic hollow spheres constituting polypropylene and sealingly enclosing a gas normally at atmospheric pressure, said plurality of openings having a total cross-sectional area substantially equal to the cross-sectional area of said pipe section, and the ratio of said second given diameter to said first given diameter lying between one-sixth and one-half.

3. A pulsation dampener according to claim 2, in which the ratio of said first given diameter to the length of said member is from one-half to one, the frequency of pressure pulses lying between 5 and 500 per second, and in which the ratio of the wall thickness of said spheres to said fourth given diameter is between one-twelfth and two-twelfths.